United States Patent
Luo

(10) Patent No.: US 7,016,762 B2
(45) Date of Patent: Mar. 21, 2006

(54) WORK ITEM WARNING SYSTEM AND METHOD

(75) Inventor: Sheng-Chi Luo, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/997,703

(22) Filed: Nov. 24, 2004

(65) Prior Publication Data

US 2005/0144058 A1     Jun. 30, 2005

(30) Foreign Application Priority Data

Dec. 26, 2003   (TW) .............................. 92137076 A

(51) Int. Cl.
*G06F 19/00*      (2006.01)
(52) U.S. Cl. ...................................... 700/175
(58) Field of Classification Search ................ 700/97, 700/100–104, 174, 175; 705/8, 9, 11, 18; 717/9
See application file for complete search history.

(56) References Cited

U.S. PATENT DOCUMENTS

| 5,515,492 A * | 5/1996 | Li et al. ..................... 715/744 |
| 6,519,498 B1 * | 2/2003 | Jevtic et al. ................ 700/101 |
| 2001/0028364 A1 * | 10/2001 | Fredell et al. .............. 345/751 |
| 2002/0007297 A1 * | 1/2002 | Clarke .......................... 705/8 |
| 2003/0171970 A1 * | 9/2003 | Kinsella ........................ 705/9 |
| 2005/0060650 A1 * | 3/2005 | Ryan et al. ................. 715/526 |

* cited by examiner

*Primary Examiner*—Albert W. Paladini
*Assistant Examiner*—Chad Rapp
(74) *Attorney, Agent, or Firm*—Wei Te Chung

(57) ABSTRACT

A work item warning system includes a database (6) storing a plurality of work item information lists (66) recording relevant information on work items, a web server (4), a number of browsers (8), and an application server (2). The application server includes: an expected completion ratio calculating sub-module (261) for calculating an expected completion ratio as at a current time for each work item; a priority index calculating sub-module (262) for calculating a priority index for each work item; a warning determining sub-module (263) for determining whether the priority index of any work item is greater than or equal to a predefined warning index of the work item; and a warning generating sub-module (264) for generating a warning if the priority index of a work item is greater than or equal to its warning index. A related work item warning method is also disclosed.

10 Claims, 7 Drawing Sheets

41 INTERFACE

CREATE A NEW WORK ITEM

NAME:

DESCRIPTION:

EMPLOYEE(S):

BEGINNING TIME:

EXPECTED FINISH-TIME:

PROJECT NAME:

IMPORTANCE INDEX:

WARNING INDEX:

SUBMIT — 412

CANCEL — 414

FIG. 3

MY PROJECTS

| PROJECT | WORK ITEMS ||||||| 
| --- | --- | --- | --- | --- | --- | --- |
| | NO. | NAME | PRIORITY INDEX | BEGINNING TIME | EXPECTED FINISH-TIME | PROCESSING STATUS | EMPLOYEES |
| INVENTORY MANAGEMENT SYSTEM | NO. 1 | SYSTEM ANALYSIS | 89 | 2003/03/23 | 2003/03/28 | 50% | DAVID |
| | NO. 2 | SYSTEM DESIGN | 65 | 2003/03/30 | 2003/04/05 | 70% | TENNY |
| | . . . | | | | | | . . . |
| | X | TESTING | 0 | 2003/05/07 | 2003/05/14 | 0% | ERIC |

WARNING

THE WORK ITEM NO. 1 (SYSTEM ANALYSIS OF INVENTORY MANAGEMENT SYSTEM) IS URGENT, PLEASE DO IT FIRST!

[ YES ] — 422

420

43 DISPLAYING AND WARNING INTERFACE

FIG. 7

WORK ITEM WARNING SYSTEM AND METHOD

BACKGROUND OF THE INVENTION

1. Field of the Invention

The present invention relates to computerized project management systems and methods, and particularly to a work item warning system and method which can automatically generate warnings advising users of the urgency of processing corresponding work items.

2. Background of the Invention

According to the American Project Management Association, the definition of "project management" is using specialty knowledge, skills, tools and/or methods to make a project good. Modern project management technologies originated from the Manhattan project of nuclear weapons development in the United States. The technology of project management has achieved great progress in the following period of about sixty years. The present technology used in project management is Gantt charts and PERT (project evaluation and review technique) charts. A Gantt chart is for scheduling work items according to required times, and for recording actual required times. A PERT chart describes relationships of work items, and uses a line with an arrowhead to indicate processing sequences of the work items. Application software such as Microsoft's Project can be used for drawing Gantt charts and PERT charts.

The art of Gantt chart drawing is disclosed in patents such as U.S. Pat. No. 6,282,514 issued on Aug. 28, 2001 and entitled "Device and Method for Project Management." The patent provides a device for generating a Gantt chart made up of at least one schedule bar. The Gantt chart generation device includes a display unit showing the Gantt chart, an input unit receiving input to mark a point at a desired position on the display, a Gantt-chart-generation processing unit generating a schedule bar having a start point and an end point obtained by setting the start point at a first position indicated by the input unit and setting the end point at a second position indicated by the input unit, and a work-step-division processing unit dividing the schedule bar into a plurality of work steps at a plurality of third positions indicated by the input unit.

An obvious disadvantage of the patent is that the system/method described therein is merely directed to the drawing of Gantt charts. However, with the ongoing development of project management techniques, other tasks such as recording of working statuses, verification of working status records and transmission of warnings need to be catered for. In particular, there is no known work item warning system and method which can calculate priority indexes for work items of projects, set warning indexes for the work items and warn corresponding users of the urgency of processing work items according to the work items' priority indexes.

SUMMARY OF THE INVENTION

Accordingly, a main objective of the present invention is to provide a work item warning system and method which can be used for calculating priority indexes for work items of projects, setting a warning index for each work item and warning corresponding users of the urgency of processing the work items according to the work items' priority indexes.

To accomplish the above objective, a work item warning system (hereinafter "the system") in accordance with a preferred embodiment of the present invention comprises a database storing a plurality of work item information lists recording relevant information on work items, a web server, a plurality of browsers and an application server. The application server comprises: an expected completion ratio calculating sub-module for calculating an expected completion ratio as at a current time for each work item; a priority index calculating sub-module for calculating a priority index for each work item; a warning determining sub-module for determining whether the priority index of any work item is greater than or equal to a predefined warning index of the work item; and a warning generating sub-module for generating a warning when the priority index of a work item is greater than or equal to its predefined warning index.

Further, the present invention provides a work item warning method comprising the steps of: (a) providing a database for storing a plurality of work item information lists recording relevant information on work items; (b) calculating an expected completion ratio for each work item based on its starting time and expected finish-time and a current time; (c) calculating a priority index for each work item according to an importance index, the expected completion ratio as at the current time and a processing status of the work item; (d) determining whether the priority index of any work item is greater than or equal to its predefined warning index; and (e) generating a warning if the priority index of a work item is greater than or equal to its predefined warning index.

Other objects, advantages and novel features of the present invention will be drawn from the following detailed description of preferred embodiments of the present invention with the attached drawings, in which:

BRIEF DESCRIPTION OF THE DRAWINGS

FIG. 3 is a schematic diagram of an exemplary interface for creating work items by utilizing the work item warning system of FIG. 1;

FIG. 7 is a schematic diagram of an exemplary interface for displaying and warning by utilizing the work item warning system of FIG. 1.

DETAILED DESCRIPTION OF THE PREFERRED EMBODIMENT

Figure 1:
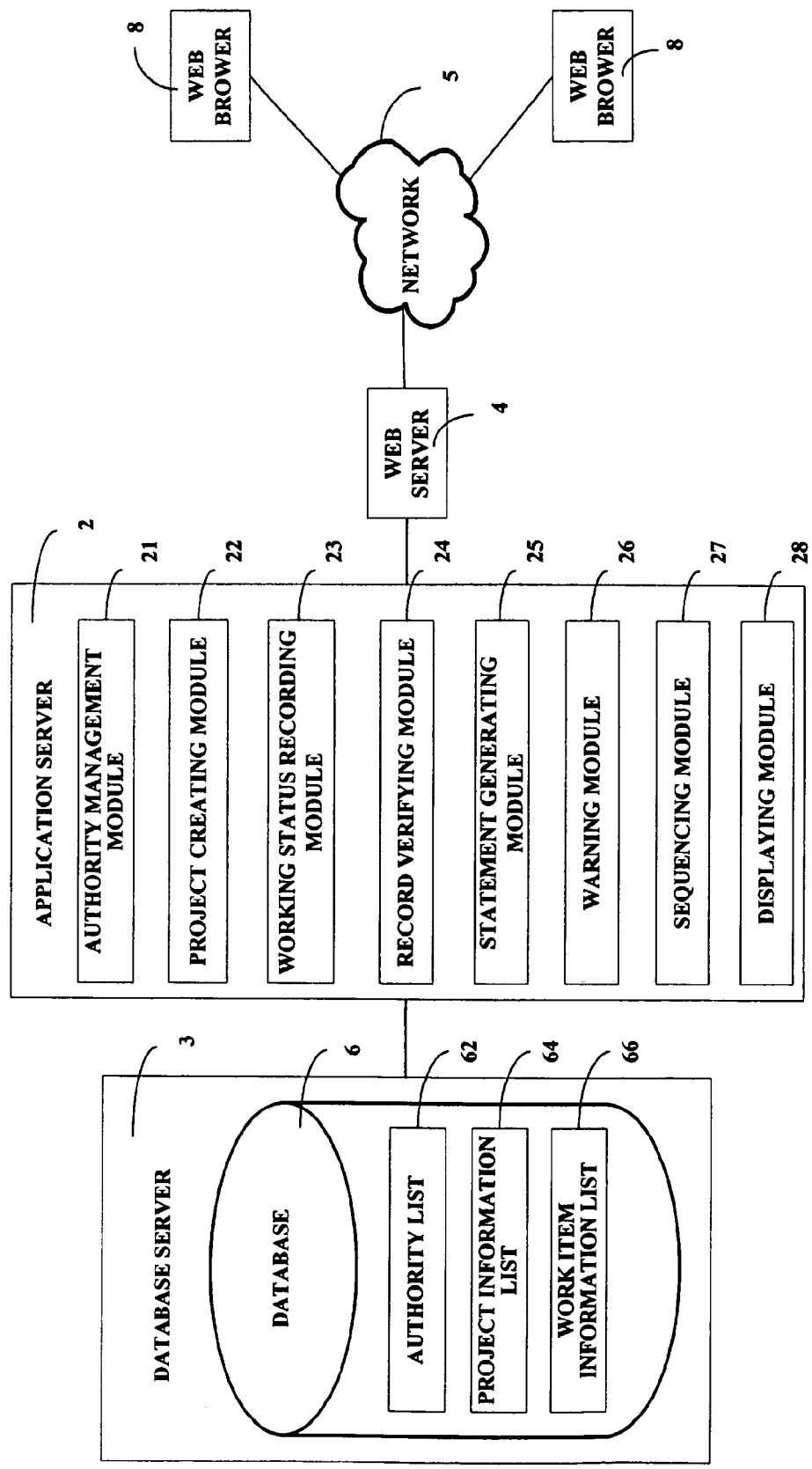
FIG. 1 is a schematic diagram of hardware and software infrastructure of a work item warning system in accordance with the preferred embodiment of the present invention.

FIG. 1 is a schematic diagram of hardware and software infrastructure of a work item warning system (hereinafter "the system") in accordance with the preferred embodiment of the present invention. The system applies a Server/Browser structure, and comprises an application server 2, a database server 3 and a web server 4. The database server 3 contains a database 6, and is used for integrating and querying relevant information when managing projects. The database 6 is used for storing all information in the system.

The application server 2 is programmed to execute a number of applications in order to implement various functions of the system. The web server 4 provides user interfaces enabling users to communicate with it via a network 5. The users can access the web server 4 by using Internet Web browsers 8 such as Microsoft Internet Explorer or by inputting corresponding instructions from client computers. In the preferred embodiment, the users include project managers and employees of an organization. Project managers are allowed to create new projects and new work items of projects, and are also allowed to verify the working status records of work items that employees have recorded. Each employee is only allowed to record working statuses of work items which he or she undertakes for the organization.

The database 6 stores information including an Authority List 62, a Project Information List 64, and a plurality of Work Item Information Lists 66 (only one shown). The Authority List 62 records user authority information including fields for "user name," "user type" and "password." The word "user" as used herein can be considered as including any project manager or employee who makes use of the system. The field "user type" provides a dropdown menu for users to select user types from a predetermined user type list. The Project Information List 64 records basic information on each project. The basic information on each project contains fields for "project name," "project manager," "starting time" and "expected finish-time." The project may for example be an engineering case, a legal case or a software development case that needs to be controlled and managed. In the preferred embodiment, a project contains more than one work item. For example, a software development case may contain work items as follows: customer needs analysis, system analysis, system design, detailed design, programming, testing and implementation. Each Work Item Information List 66 records relevant information on each work item, including fields for "work item name," "working status records," "employee(s)," "starting time," "expected finish-time," "project name," "importance index," "warning index," "expected completion ratio," "priority index" and "actual finish-time." The employees are persons who undertake the work item. The importance index indicates a degree of importance of the work item. The priority index is a dynamic value for recording a processing sequence of the work item. A larger priority index of a work item indicates that the work item needs to be processed prioritizedly. The warning index is a static value, which is a critical value predetermined by project managers. When the priority index of a certain work item is greater than or equal to its predefined warning index, a warning is generated, and corresponding users are advised of the urgency of processing the work item. The field of "working status records" contains three sub-fields: "working status," "processing status," and "verifying." The sub-field of "processing status" records a current processing rate of the work item. The sub-field of "verifying" is a Boolean value, which indicates whether the working status records have been verified. A Boolean value of "0" means that the working status records have not been verified. A Boolean value of "1" means that the working status records have been verified.

The application server 2 comprises an authority management module 21, a project creating module 22, a working status recording module 23, a record verifying module 24, a statement generating module 25, a warning module 26, a sequencing module 27, and a displaying module 28. The authority management module 21 is used for identifying and managing user authorities based on the User Authority List 62. The project creating module 22 is used for creating new projects and new work items, and obtaining basic information on the new projects and work items. The basic information on a project includes "project name," "project manager," "beginning time" and "expected finish-time" of the project. The basic information on a work item includes "attached project name," "work item name," "employee(s)," "expected completion ratio," "working status," "importance index," "priority index," "warning index," and "beginning time" and "expected finish-time" of the work item. The basic information on a newly created project is recorded in the Authority List 62, and the basic information on each new work item is recorded in a new Work Item Information List 66 created by the database server 3. The working status recording module 23 is used for recording working statuses for work items in the field of "working status records" of the Work Item Information Lists 66, and for each such work item setting a Boolean value of a corresponding sub-field of "verifying" as "0." The record verifying module 24 verifies working status records, and for each such working status record sets a Boolean value of the corresponding sub-field of "verifying" as "1." The statement generating module 25 selects a project, and generates working status statements in a predetermined format based on all verified working status records of the selected project. The predetermined format may be Microsoft Word, Microsoft Excel, or any other suitable format. The warning module 26 is for calculating a priority index for each work item based on the working status records, and for generating a warning advising corresponding users of the urgency of processing a work item when the priority index of the work item is greater than or equal to its predefined warning index. The sequencing module 27 is for prioritizing work items of projects according to their priority indexes. The displaying module 28 is for displaying the work items in their prioritized sequence.

Figure 2:
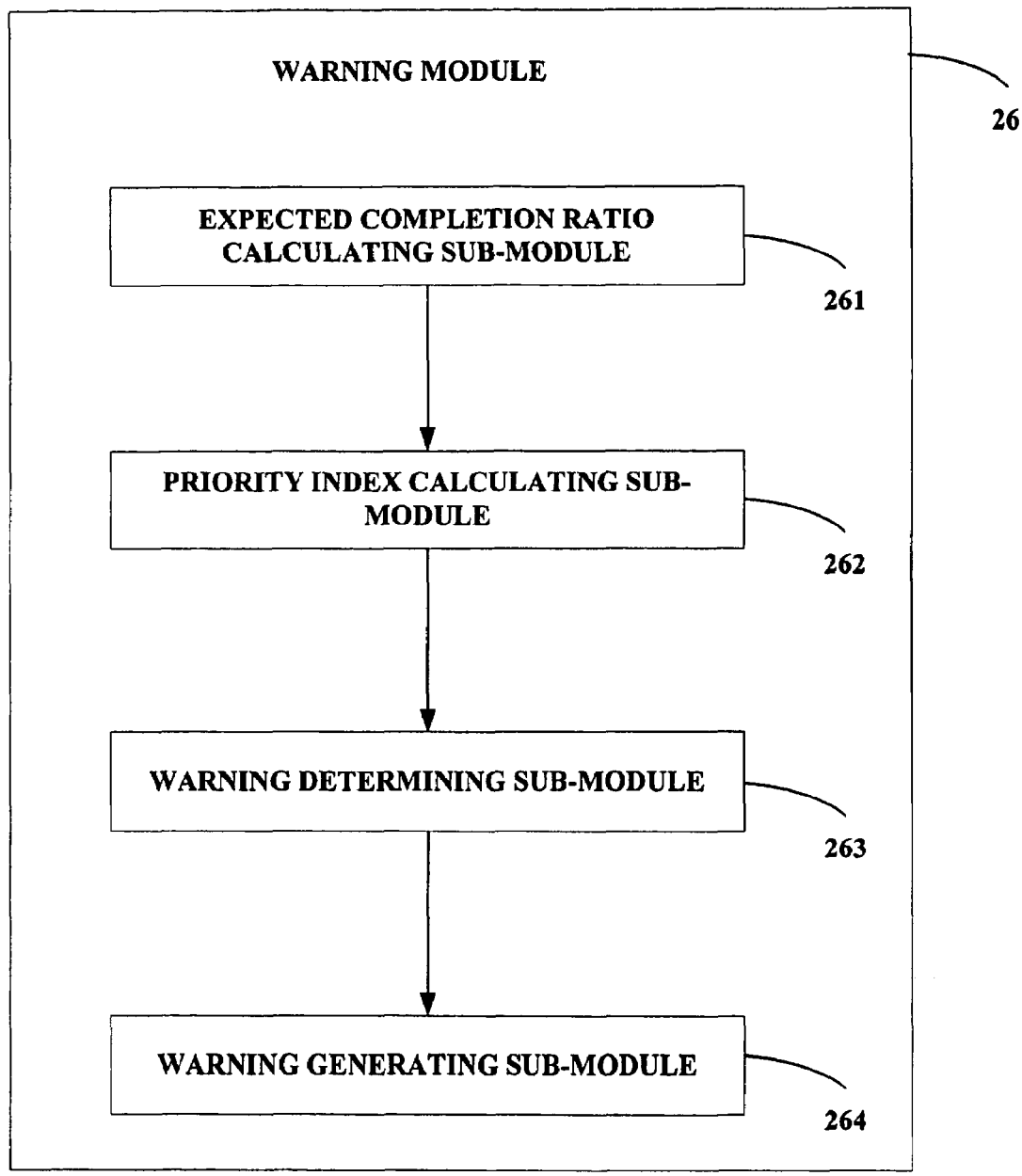
FIG. 2 is a schematic diagram of function sub-modules of a warning module of an application server of the work item warning system of FIG. 1.

FIG. 2 is a schematic diagram showing function sub-modules of the warning module 26. The warning module 26 comprises an expected completion ratio calculating sub-module 261, a priority index calculating sub-module 262, a warning determining sub-module 263, and a warning generating sub-module 264. The expected completion ratio calculating sub-module 261 is used for calculating an expected completion ratio as at a current time for each work item according to a beginning time and an expected finish-time of the work item and the current time, and for filling in the expected completion ratio as at the current time in a corresponding field of a Work Item Information List 66. The expected completion ratio as at the current time is calculated according to the formula: (current time—beginning time)/(expected finish-time—beginning time)*100%. The result is recorded in the Work Item Information List 66 of the corresponding work item. The priority index calculating sub-module 262 is used for calculating a priority index for each work item according to an importance index, an expected completion ratio as at a current time, and a current processing status of the work item. The priority index is calculated according to the formula: importance index *(1—expected completion ratio)/(1—processing status). The warning determining sub-module 263 is used for determining whether the priority index of any work item is greater than or equal to its predefined warning index. If the priority index of a work item is greater than or equal to its predefined warning index, the warning generating sub-module 264 generates a warning, and transmits the warning to corresponding users for processing of the work item preferentially.

FIG. 3 is a schematic diagram of an exemplary interface 41 for creating a work item of a new project by utilizing the system. After logging on the system, a project manager is allowed to use the interface 41 to create new work items and input information to various fields including work item name, employee(s), beginning time, expected finish-time, project name, importance index and warning index. After inputting relevant information, the project manager clicks a "submit" button 412 to submit the information, or presses a "cancel" button 414 to cancel the operation. The submitted information is recorded in a new Work Item Information List 66, which is stored in the database 6.

Figure 4:
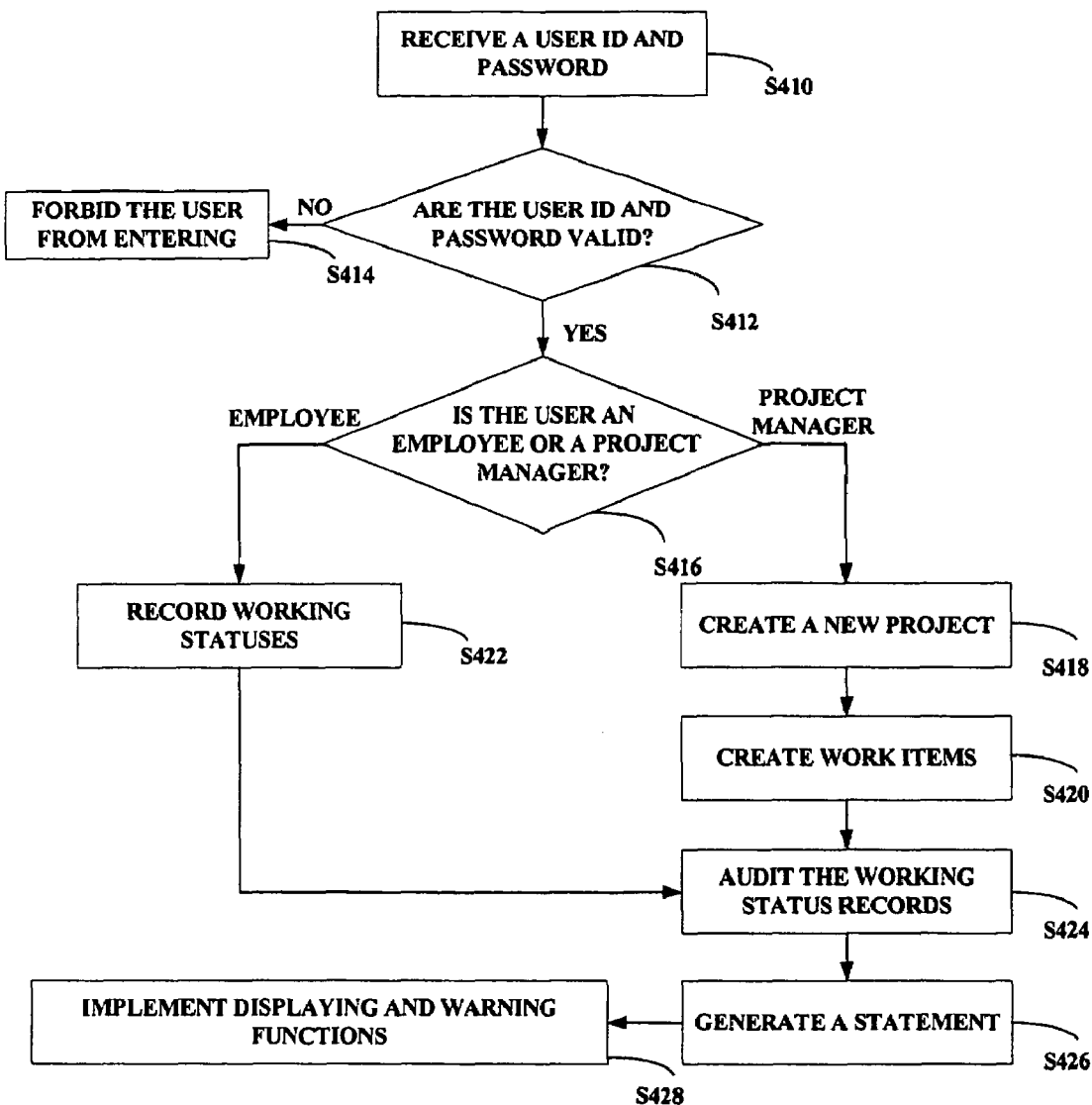
FIG. 4 is a flowchart of a preferred method for generating a working status statement according to the present invention.

FIG. 4 is a flowchart of the preferred method for generating a working status statement according to the present invention. In step S410, the authority management module 21 receives a user ID and password. In step S412, the authority management module 21 determines whether the user is an authorized user by identifying the user ID and password according to the User Authority List 62. If the user is not an authorized user, in step S414, the authority management module 21 forbids the user from entering the system. If the user is an authorized user, in step S416, the authority management module 21 determines whether the user is a project manager or an employee according to the User Authority List 62. If the user is an employee, in step S422, the working status recording module 23 records working statuses of various work items, and for each such work item sets a Boolean value of a corresponding sub-field of "verifying" as "0," whereupon the procedure goes directly to step S424 described below. If the user is a project manager, in step S418, the project creating module 22 is activated, and allows the project manager to create a new project. Then in step S420, the project manager creates work items for the new project, whereupon the procedure goes to step S424. In step S424, the record verifying module 24 verifies the working status records, and for each working status record sets a Boolean value of the corresponding sub-field of "verifying" as "1." In step S426, the statement generating module 25 selects a project, and integrates all verified working status records of the selected project into a working status statement in a predetermined format. In step S428, the warning module 26, the sequencing module 27 and the displaying module 28 implement displaying and warning functions. In particular, said modules 26, 27, 28 prioritize and display the work items of a project the project manager undertakes, and advises the project manager of the urgency of processing a work item. Said displaying and warning functions are described in more detail below in relation to FIG. 5.

Figure 5:
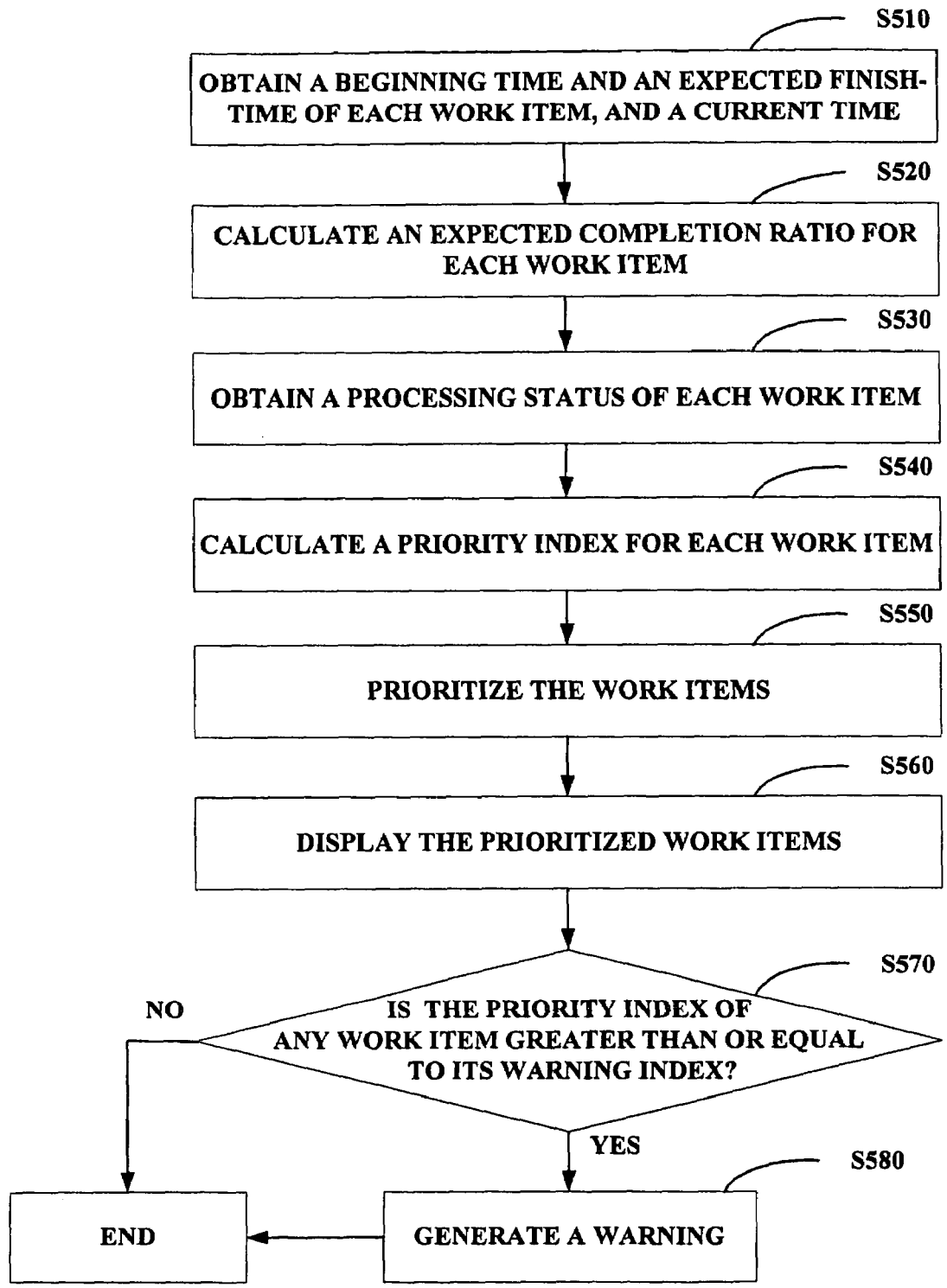
FIG. 5 is a flowchart of a preferred method for implementing displaying and warning functions of the present invention.

FIG. 5 is a flowchart of the preferred method for implementing the displaying and warning functions of the present invention. Reference is also made to the operation interface 42 shown in FIG. 6, and the displaying and warning interface 43 shown in FIG. 7 and described in detail below. When an employee enters the operation interface 42 or a project manager activates the displaying and warning functions of the system, the warning and displaying function automatically displays a warning dialog box 420 if applicable. In step S510, the expected completion ratio calculating sub-module 261 obtains a beginning time and an expected finish-time of each work item that the user undertakes from the database 6, and a current time. In step S520, the expected completion ratio calculating sub-module 261 calculates an expected completion ratio as at the current time for each work item based on the starting time and the expected finish-time of the work item and the current time, and fills the expected completion ratio as at the current time in a corresponding field of a relevant Work Item Information List 66. In step S530, the priority index calculating sub-module 262 obtains current processing statuses of various work items from the Work Item Information List 66. In step S540, the priority index calculating sub-module 262 calculates a priority index for each work item according to the importance index, the expected completion ratio and the processing status of the work item, and fills the priority index in a corresponding field of the Work Item Information List 66. In step S550, the sequencing module 27 prioritizes the work items in ascending order (or in descending order) according to their priority indexes. In step S560, the displaying module 28 displays the prioritized work items. In step S570, the warning determining sub-module 263 determines whether the priority index of any work item is greater than or equal to its predefined warning index. If the priority index of a work item is greater than or equal to its predefined warning index, in step S580, the warning generating sub-module 264 generates a warning that advises the employee in the operation interface 42 or the project manager in the displaying and warning interface 43 to process the work item preferentially, whereupon the procedure is ended. If the priority indexes of all work items are not greater than or equal to their corresponding predefined warning indexes, the procedure is ended.

Figure 6:
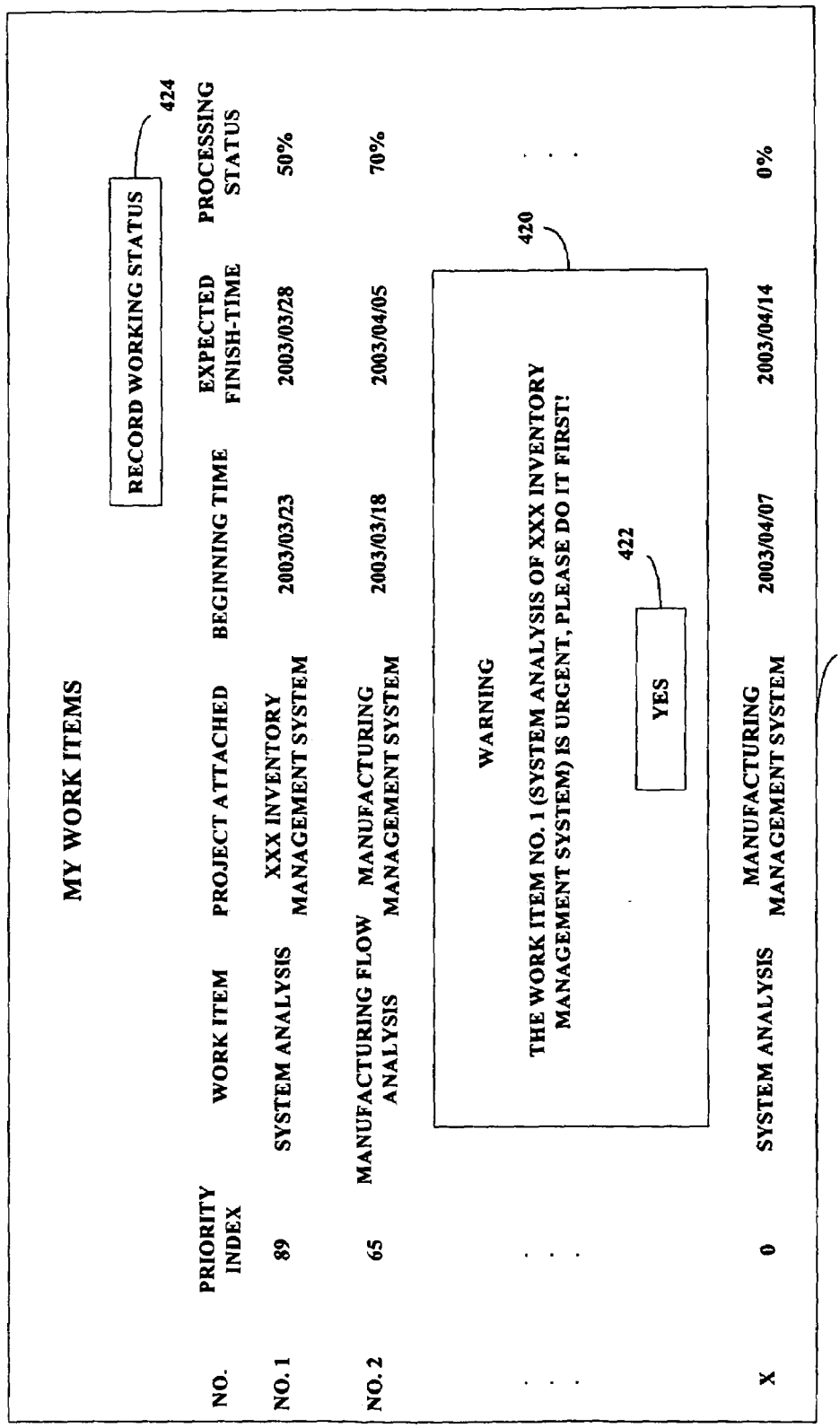
FIG. 6 is a schematic diagram of an exemplary operation interface for recording working statuses by utilizing the work item warning system of FIG. 1.

FIG. 6 is a schematic diagram of an operation interface 42 for recording working statuses by utilizing the system. The operation interface 42 displays information on all work items undertaken by a selected employee. The work items are displayed in ascending order (or in descending order) based on their priority indexes. If the priority index of a work item that the employee undertakes is greater than or equal to its warning index, the operation interface 42 automatically displays a dialog box 420 containing a warning that advises processing of the work item preferentially. The employee can process the work item immediately after clicking a "YES" button 422 in the dialog box 420 using a computer mouse. If the employee double-clicks a work item in the operation interface 42, detailed information on the work item is displayed. The detailed information includes project name, work item name, employee(s), expected completion ratio, processing status, importance index, priority index, warning index, beginning time, expected finish-time, actual finish-time, and a plurality of working status records. The employee can select a work item and click a "Record Working Status" button 424 to record the working status of the selected work item.

FIG. 7 is a schematic diagram of an exemplary interface 43 for displaying and warning by utilizing the system. The displaying and warning interface 43 displays information on all work items of projects undertaken by a selected project manager. The work items are displayed in ascending order (or in descending order) based on their priority indexes. If the priority index of a work item of a project undertaken by the project manager is greater than or equal to its warning index, the displaying and warning interface 43 automatically displays a dialog box 420 containing a warning that advises processing of the work item preferentially. The project manager can click a "YES" button 422 in the dialog box 420 by using a computer mouse, which makes the dialog box 420 disappear. If the project manager double-clicks a work item in the displaying and warning interface 43, detailed information on the work item is displayed. The detailed information includes work item name, employee(s), expected completion ratio, processing status, importance index, priority index, warning index, beginning time, expected finish-time, actual finish-time, and a plurality of working status records.

Although the present invention has been specifically described on the basis of a preferred embodiment and preferred methods, the invention is not to be construed as being limited thereto. Various changes or modifications may be made to the embodiment and methods without departing from the scope and spirit of the invention.

What is claimed is:

1. A work item warning system applying a server/browser structure, comprising:
   a database storing a plurality of work item information lists recording relevant information on work items;
   an expected completion ratio calculating module for calculating expected completion ratios for the work items;
   a priority index calculating module for calculating priority indexes for the work items;
   a warning determining module for determining whether the priority index of any work item is greater than or equal to a warning index of the work item; and
   a warning generating module for generating a warning when the priority index of a work item is greater than or equal to the warning index of the work item.

2. The work item warning system according to claim 1, further comprising a project creating module for creating new projects and one or more new work items of the new projects.

3. The work item warning system according to claim 1, further comprising a working status recording module for recording working statuses of the work items and generating working status records.

4. The work item warning system according to claim 3, further comprising a record verifying module used to verify working status records.

5. The work item warning system according to claim 1, further comprising an authority management module for identifying and managing authorities assigned to different users.

6. A computer-enabled work item warning method which can automatically generate one or more warnings and warn users of the urgency of processing one or more particular work items, the method comprising the steps of:
   providing a database storing a plurality of work item information lists recording relevant information on work items;
   calculating expected completion ratios for the work items;
   calculating priority indexes for the work items;
   determining whether a priority index of any work item is greater than or equal to a warning index of the work item; and
   generating a warning if the priority index of a work item is greater than or equal to the warning index of the work item.

7. The method according to claim 6, further comprising the step of creating the work items.

8. The method according to claim 6, further comprising the steps of recording working statuses of the work items and generating working status records.

9. The method according to claim 6, further comprising the step of verifying the working status records.

10. A computer-enabled work item warning method which can automatically generate one or more warnings and warn users of the urgency of processing one or more particular work items, the method comprising the steps of:
   providing a database storing a plurality of work item information lists recording relevant information on work items;
   calculating expected completion ratios for the work items;
   calculating priority indexes for the work items based upon at least the expected completion ratios; and
   generating a warning if the priority index of a work item is greater than or equal to a warning index of the work item.

* * * * *